Aug. 14, 1928.
L. H. CHURCH
CAPPED ELBOW
Filed Jan. 26, 1924
1,681,097
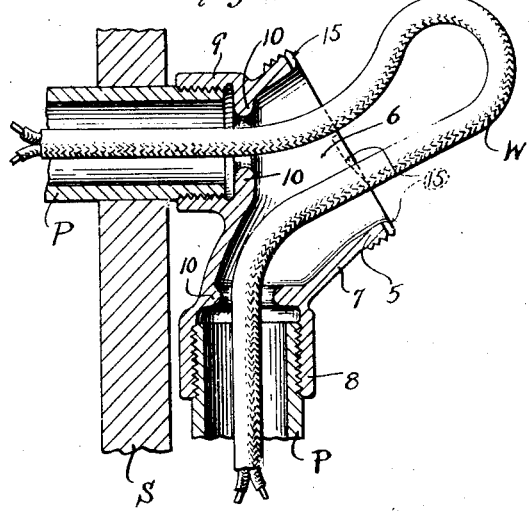
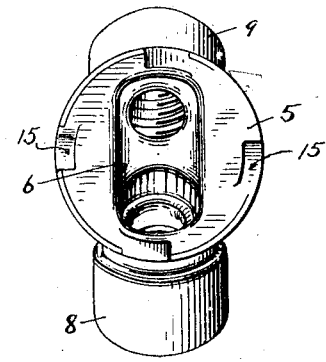
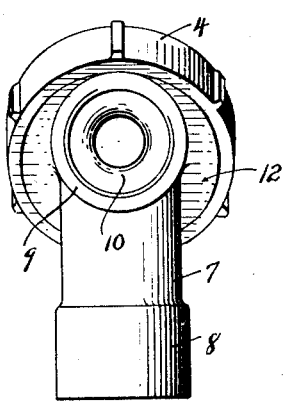
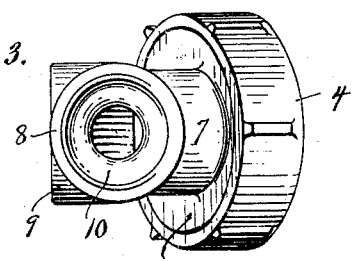
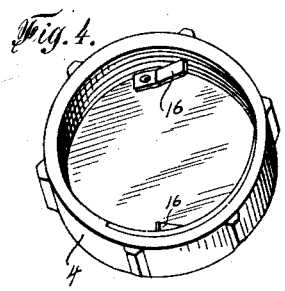
Inventor
Lewis H. Church
By Attorneys Patented Aug. 14, 1928.

1,681,097

UNITED STATES PATENT OFFICE.

LEWIS H. CHURCH, OF ROSELLE, NEW JERSEY, ASSIGNOR TO THE THOMAS & BETTS CO., OF ELIZABETH, NEW JERSEY, A CORPORATION OF NEW JERSEY.

CAPPED ELBOW.

Application filed January 26, 1924. Serial No. 688,651.

This invention relates to electrical conduit fittings and more particularly to capped elbows for connecting conduit lines.

An object of the invention is to produce a capped elbow for joining pipes or conduits used in conveying electrical transmission lines, and a further object is to provide an elbow fitting which holds connecting conduits closely to the wall of a building or structure in which the conduits and wiring are installed. A further object is to produce a water proof capped elbow, as well as provide it with an internally straight wire guideway to prevent the wires snarling up or becoming entangled when drawn through the conduit; and among other things, a purpose is to provide a locking cap which cannot be removed after the installation has once been completed and the cap applied.

The accompanying drawing illustrates the construction and use of the improved capped elbow, certain changes in which may be made without departing from the principle of the invention.

Figure 1 illustrates a longitudinal section taken through the capped elbow and through the conduits connected therewith, as well as showing wires which are drawn from the fitting and from one conduit and made ready to be thrust forwardly through the other conduit.

Figure 2 shows a front elevation of the capped elbow with the screw cover or cap removed.

Figure 3 illustrates a cluster view of the device in rear, side and bottom projections.

Figure 4 is a view in perspective of the cap, looking from below, and showing the location of the spring pressed pawls adapted to engage ratchet teeth formed on the rim of the elbow to irremovably lock the cap in place after installation is completed.

The conduit fitting consists of a round threaded head or cylindrical body 5 provided with preferably a substantially rectangular or elongated wire guide passage, opening or chamber 6 formed through the face of the head. An internally threaded flanged cap 4, which may be self-locking and non-removable as later described, is carried by the head 5, and upon removing the cap or closure from the fitting, access is had to the wire for manipulating it down or through one conduit or the other. A neck or trunk part 7 is integral with the head and projects at an angle rearwardly therefrom and terminates at the end thereof in the form of an internally threaded pipe receiving sleeve 8. The upper part of the head 5 carries a threaded sleeve or pipe receiving duct 9. The mouths or openings of the pipe sleeves 8 and 9 are at right angles to each other. Both threaded sleeve ducts 8 and 9 connect with the open wire guide 6.

The head 5 is flat and disk-like with front and rear overhanging parallel faces which in effect spreads across the sleeves 8 and 9 and neck 7. The mouths of the sleeves 8 and 9, i. e. the end edges defining the sleeve openings, are disposed right angular to each other. Furthermore, the mouth of the wire guide passage 6 is inclined at an angle to both planes of both mouth sleeves 8 and 9.

An ovaled ring or shoulder bushing 10 is formed at the inner terminus of the threaded sleeves or branches 8 and 9 for the purpose of guiding the wire W through the fitting and through the conduits without damaging the insulation on the wire. The ovaled shoulder rings are made substantially small in diameter, thereby restricting the sleeve openings; and thus the design and construction of the shoulder is such that the wire W is held away from the sharp edges of the conduits serving to prevent damage to the wire such as would occur if they scrape against the edges of the conduits.

It is to be observed that the external circumference of the lower sleeve 8 is disposed substantially on a tangent to the plane of the outer vertical edge of the upper sleeve 9, which is to say that the flat neck 7, as hereinbefore described, is brought back from the head on a slope so that the outer edge of the upper sleeve 9 is in an alignment with the circumference of the lower sleeve 8. This design and construction of the device constitutes one of the features of my invention whereby the conduit fitting is made to lie closely to the wall of the building equipped with the electrical transmission line.

Referring to Figure 1 in the drawing, it is observed how the vertically disposed pipe P stands in close relation to the wall S of the building. In this manner the pipe P is held closely to the wall S which produces a neater and more substantial design and structural arrangement than obtainable with other forms of conduit capped elbows. The wire W in Figure 1 is shown drawn out at the elbow from the wire guide chamber 6, and looped back and made ready to be thrust through either the horizontally or vertically disposed pipe P for the purpose of illustrating how the wire W may be manipulated and pushed through the conduit.

My capped elbow and conduit system is improved over other patented devices in this art in respect to the close fitting relation of the conduits to the building wall together with the improved design and structure of the elbow itself which makes possible this refinement in the installation of the conduit system in a building. While the rectangular shaped opening 6 stands outwardly from the wall and is thoroughly accessible to the mechanic making the installation, still the two threaded branches or sleeves 8 and 9 project rearwardly from the head and stand right angular to each other and in substantially the same plane which constitutes improvements in structure and use over fittings now employed.

In addition to the foregoing improvements I preferably construct the head 5 with a rear flat surface 12 spreading across or over the neck 7 and sleeve 9. This design and construction not only saves in material, but improves the weathering characteristic of the capped part of the elbow causing it to more rapidly throw off water because of the sharply defined flat inclined drain surface.

In particular, the oblong, elongated or rectangular-shaped wire guide passage enables the head 5 to be flat on the front and rear faces. Furthermore the wires guide and pull through the rectangular-shaped passage more readily without tangling than through larger size passages.

In some cases it is desirable to screw the cap 4 onto the elbow and lock it in position against removal; and to this end a pawl and ratchet construction is utilized by forming ratchet teeth in one part and anchoring a pawl to the other part. The ratchet teeth 15 are preferably cast in the head and a cooperating spring catch pawl 16 is anchored within the cap, the pawl 16 being relatively narrow is concealed between the surface of the rim 5 and the rear surface of the cap 4. This construction renders it impossible to remove the cap from the pipe connecting member 7—9 because of the fact that said pawl or catch 16 is totally buried and concealed within a ratchet tooth 15 between the head 5 and cap 4. Furthermore the flange of the cap covers the pawl 16 from one side thereof, while the edge or shoulder defining the ratchet tooth 15 covers and conceals the pawl from the other side thereof. Once the cap is screwed in place, it is impossible to pick open, dislodge or tamper with the locking-catch member 16. As the cap is screwed down over the head the flexible pawl engages the ratchet teeth thereby preventing the removal of the cap. The spring pawl 16 is protected and concealed inside the flanged cap and once the cap is screwed into place, there is no chance of removing it.

It will be observed that the means to fasten the pawl 16 to the cap 4, may consist of rivets 17, although other anchorage may be used. A rivet or rivets 17 are passed through one end of the spring pawl thereby securing it to the inside of the cap adjacent the cap flange 4, thus leaving the other end of the spring face to snap into the head notches or shoulders 15. The anchorage means, i. e. the rivets are backed up by the rim of the head 5. That is, that portion of the pawl 16 which is secured to the cap is so disposed in close proximity to the head flange 4 as to place the rivets between the cap and the metal or rim of the elbow head 5, so that even though the head of the rivet 17 on the outside of the cap were cut off by one endeavoring to tamper with the wiring, the pawl could not be loosened from the cap, because the rim of the head would prevent the rivet from being driven inwardly out of the cap. It is therefore impossible to remove the cap once the pipes P, wires W, and cap 4 are installed, unless considerable damage is wrought to the elbow and that would attract attention and call for repair and investigation.

What is of further importance, is that the flange 4 of the cap overhangs the periphery of the head 5 and conceals the spring pawl 16, its anchorage means 17, and the shoulder notch 15, thereby sealing these parts under the cap between it and the elbow head 5. This construction prevents one tampering with the elbow since a sharp tool or other instrument cannot be inserted to pry up or loosen the spring pawl or rivets.

This invention therefore constitutes an important feature in electrical installations, particularly adjacent meters where it is usually necessary to leave wires in the conduits exposed during the installation work but where it is desirable to positively seal them when the work is completed, and this lock-on cap does so. Once it is in place, the conduits P are for all practical purposes one and the same pipe since entry thereto cannot be gained and the wire cannot be tapped back of the meter.

The wall of the pipe fitting terminates with a flat front rim, face or edge which defines the opening 6 to be closed by the cap or closure 4. The closure itself has a flat wall as shown which fits down close to the flat front face of the fitting. Lock-on ratchet-tooth-and-pawl means 15 and 16 are disposed between the flat face of the wall defining the opening 6 and the rear flat face of the cap within the threaded flange to lock the closure 4 on the pipe fittings. The closure cannot now be removed and hence the wiring cannot be tampered with.

The threads on the fitting 7 and cap 4 constitute interengaging means by which relative motion between the two members causes the closure to engage the fitting, and the relative motion causes locking engagement to be effected between the ratcht-tooth-and-spring pawl means so that the cap cannot be removed.

What I claim is:

1. A capped fitting comprising, two integral sleeves having mouths in planes at right angles to each other, the plane of the mouth of one sleeve being tangent to the rim of the mouth of the other sleeve, an externally threaded cylindrical head formed integrally with the two sleeves and provided with an internally smooth wire guide passage the plane of the mouth of which is inclined to the planes of the mouths of both aforesaid sleeves, and a screw threaded cap mounted on the head closing the wire guide passage.

2. A capped elbow comprising a cylindrical head having a flat front face, a threaded sleeve integral with the upper part of the head, a hollow neck integral with the lower portion of the head and extending rearwardly under the upper sleeve, the said flat cylindrical head over-hanging the sleeve and neck, a threaded sleeve integral with the lower end of the neck, the plane of the mouth of the upper sleeve being tangent to the rim of the lower sleeve, said head provided with an elongated wire guide passage reaching from the first named sleeve down to the neck, and a cap covering the wire guide passage.

3. A capped elbow comprising, a threaded sleeve, a neck including a threaded sleeve on one end thereof, said sleeves having the planes of their mouths at right angles one to the other, a cylindrical externally threaded head integral on the sleeve and neck, said head having a flat front face inclined at an angle to the planes of the mouths of the sleeves, said head being provided with an elongated internally smooth wire guide passage therein formed and which reaches from the first named sleeve through the neck to the other sleeve, and a cap enclosing the wire guide passage.

4. A capped pipe fitting comprising a cylindrical head having a flat front face, a threaded sleeve integral with the upper part of the head, a hollow neck integral with the lower portion of the head and extending rearwardly under the upper sleeve and including a threaded sleeve, said flat head being provided with a wire guide passage which connects with the neck and sleeves, a cap including an internally threaded flange covering the wire guide passage, a ratchet depression made in the flat front face of the head, and a spring pawl concealed on the rear face of the cap inside the flange adapted to automatically lock the cap when it is screwed onto the head.

5. A capped elbow comprising, a cylindrical head threaded to receive a cap and having a rim formed with a locking shoulder, a sleeve branching off from the head, a threaded cap for the head, a spring pawl to engage the locking shoulder, and means extending through the cap to secure the pawl to the cap disposed between the cap and rim to prevent removal of the means when the cap is in place whereby the threading of the cap home upon the head serves to lock the former in position and prevent the removal of the securing means.

6. A capped elbow comprising a cylindrical head threaded to receive a cap and formed with a ratchet surface, and including means to attach the elbow to a pipe, a threaded cap for the head, a spring pawl to engage the ratchet surface, and means extending through the cap to secure the pawl to the cap disposed between the cap and head the securing means being so disposed that the threading of the cap home upon the head prevents the removal thereof.

7. A conduit fitting comprising; a threaded member, having an entry passage defined by a rim, a locking shoulder in the rim, and including means to attach a conduit thereto; a threaded cap for the member, a spring pawl carried with the cap, and a rivet passed through the cap and through the pawl to anchor the cap and pawl together, and said rivet being disposed in line with and backed up by the rim to prevent its removal when the cap is in place.

8. A lock-on cap for a threaded tubular end formed with a locking shoulder, including an inwardly threaded flange, a spring latch to engage the shoulder and concealed by the flange, and a rivet to secure the latch to the cap backed up by the metal of the tubular end.

9. In a fitting for conduit wiring, having an opening in one of its walls permitting access to the wiring in the fitting, and having means for the connection of conduits through which wires are passed into the fitting, and a closure including a flat rear face for said opening, said closure and fitting being provided with interengaging means permitting a movement of the closure relative to the fitting to secure them together and to close said opening, the opening aforesaid being defined by a flat front face toward which the flat rear face of the closure is moved, and locking means including a ratchet tooth and spring pawl means disposed between and carried on the flat front face defining the opening and the flat rear face of the closure to lock said closure in closed position to seal the opening against tampering with the wiring in the fitting.

In testimony whereof I affix my signature.

LEWIS H. CHURCH.